US009812086B2

(12) United States Patent
Minato et al.

(10) Patent No.: US 9,812,086 B2
(45) Date of Patent: Nov. 7, 2017

(54) METHOD FOR DISPLAYING BY DETERMINED COLOR RESULT IMAGE OF AREA EXTRACTION RESULT

(71) Applicant: OMRON Corporation, Kyoto-shi, Kyoto (JP)

(72) Inventors: Yoshihisa Minato, Kyoto (JP); Yukiko Yanagawa, Nara (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/384,393

(22) PCT Filed: Nov. 16, 2012

(86) PCT No.: PCT/JP2012/079844
§ 371 (c)(1),
(2) Date: Sep. 11, 2014

(87) PCT Pub. No.: WO2013/136593
PCT Pub. Date: Sep. 19, 2013

(65) Prior Publication Data
US 2015/0138225 A1  May 21, 2015

(30) Foreign Application Priority Data
Mar. 14, 2012 (JP) .................. 2012-057369

(51) Int. Cl.
*H04N 1/56* (2006.01)
*G06T 11/60* (2006.01)
(Continued)

(52) U.S. Cl.
CPC .............. *G09G 5/024* (2013.01); *G06T 7/12* (2017.01); *G06T 7/194* (2017.01); *G06T 11/001* (2013.01);
(Continued)

(58) Field of Classification Search
CPC ......... G06F 17/30259; G06F 17/30784; G06F 17/30247; G06F 17/3079; G06F 7/24;
(Continued)

(56) References Cited

U.S. PATENT DOCUMENTS 6,167,167 A * 12/2000 Matsugu .............. H04N 19/503
358/538
6,728,400 B1 * 4/2004 Matsugu ............... G06T 7/0081
382/164
(Continued)

OTHER PUBLICATIONS

Rother, C. et al.; "GrabCut": Interactive foreground extraction using iterated graph cuts, in proceedings of ACM SIGGRAPH 2004 Papers, pp. 309 to 314, 2004 (6 pages).
(Continued)

*Primary Examiner* — Devona Faulk
*Assistant Examiner* — Kevin Wu
(74) *Attorney, Agent, or Firm* — Osha Liang LLP

(57) ABSTRACT

A method for displaying a result of area extraction processing of dividing a target image into a foreground area and a background area includes a result acquisition step of acquiring a result of the area extraction processing on the target image, an extraction result image generation step of acquiring an extraction result image representing an estimated foreground area or an estimated background area estimated by the area extraction processing or a boundary between the estimated foreground area and the estimated background area, based on the acquired result, and a display step of generating a composite image by combining the extraction result image with the target image, and displaying the composite image on a display device. The extraction result image generation step includes a color extraction step and a color determination step.

16 Claims, 12 Drawing Sheets

(51) Int. Cl.
*G09G 5/02* (2006.01)
*G06T 11/00* (2006.01)
*G06T 7/12* (2017.01)
*G06T 7/194* (2017.01)

(52) U.S. Cl.
CPC .............. *G06T 11/60* (2013.01); *G09G 5/026* (2013.01); *H04N 1/56* (2013.01); *G06T 2207/10024* (2013.01); *G06T 2207/20104* (2013.01); *G06T 2207/20221* (2013.01); *G09G 2320/0666* (2013.01); *G09G 2340/12* (2013.01)

(58) Field of Classification Search
CPC ........................ G06F 17/30799; H04N 19/503; H04N 9/646; H04N 1/40062; H04N 1/60; H04N 1/6027; H04N 1/6088; G06T 7/0081; G06T 13/80; G06T 7/0079; G06T 7/001; G06T 7/0024; G06T 7/003; G06K 9/38; G06K 15/1892; G06K 2209/00; G06K 2209/01; G06K 9/46; G06K 9/00456
See application file for complete search history.

(56) References Cited

U.S. PATENT DOCUMENTS

| | | | | |
|---|---|---|---|---|
| 7,428,335 | B2* | 9/2008 | Ida | G06F 17/30259 382/177 |
| 8,122,378 | B2* | 2/2012 | Ciudad | G06T 13/80 715/838 |
| 2004/0105594 | A1* | 6/2004 | Blake | G06T 7/0083 382/266 |
| 2006/0250669 | A1* | 11/2006 | Beretta | H04N 1/00002 358/518 |
| 2007/0009153 | A1* | 1/2007 | Gallafent | G06T 7/0081 382/173 |
| 2007/0217701 | A1* | 9/2007 | Liu | G06K 9/38 382/234 |
| 2010/0158378 | A1* | 6/2010 | Wu | G06T 7/2053 382/190 |
| 2015/0332115 | A1* | 11/2015 | Kakuta | G06K 9/4652 382/165 |
| 2017/0085887 | A1* | 3/2017 | Rosewarne | H04N 19/16 |

OTHER PUBLICATIONS

Duchenne, O. et al.; "Fast interactive segmentation using color and textural information," <http://imagine.enpc.fr/%7Eaudibert/RR0626.pdf>, CERTIS Technical report 06 to 26, 2006 (20 pages).

J. Ning, et al.; "Interactive image segmentation by maximal similarity based region merging," Pattern Recognition 43 (2010) 445 to 456 (12 pages).

International Search Report for corresponding International Application No. PCT/JP2012/079844, dated Jan. 29, 2013 (2 pages).

Extended European Search Report in counterpart European Application No. 12 87 1528.1 dated Aug. 29, 2016 (9 pages).

"Adobe After Effects CS5 Reviewer's Guide"; Retrieved from Internet on Aug. 19, 2016; Relieved for Internet URL: http://www.professional.at/index.php?option=com_docman&task=doc_download&gid=926 (29 pages).

K. Kylander et al; "GIMP: The Official Handbook—Gimp User's Manual"; The Coriolis Group, Scottsdale, AZ USA; Nov. 3, 1999 (924 pages).

* cited by examiner (a)

(b)

(c)

(a)

110

(b)

110

(a)

(b)

METHOD FOR DISPLAYING BY DETERMINED COLOR RESULT IMAGE OF AREA EXTRACTION RESULT

BACKGROUND

Technical Field

The present invention relates to a technique for displaying a result, of an area extraction on an image, in an easily recognizable manner.

Related Art

Processing called area extraction (segmentation) is one type of digital image processing performed by a computer. The area extraction processing is processing of dividing a target image into a foreground (portion to be extracted) and a background (other portions), based on image features such as colors and edge. The processing is used for a purpose of extracting a portion of an object or a person as a target of image processing or image recognition, for example.

Various algorithms for the area extraction processing have been proposed, and the extraction accuracy of the area extraction processing has improved. However, there is no guarantee that only a portion, intended by a user, is extracted without fail by performing the processing only once. Therefore, most systems have a function of displaying an extraction result on a screen, so as to allow the user to check the sufficiency of the foreground area or whether the processing needs to be started over. Methods for displaying the extraction result include: a method of drawing a contour line of the extracted foreground area on an original image (see Non Patent Literature 1); a method of covering a background area with a mask image so that only the foreground area is displayed (see Non Patent Literature 2); a method of overlaying a mask image of a single color, representing the foreground area or the background area, on the original image to be displayed (see Non Patent Literature 3); and the like.

In conventional systems, the contour line and the mask image are drawn with an eye-catching color such as magenta and yellow in many cases, to achieve high visibility of the contour line and the mask image representing the extraction result. However, when the foreground or the background of the original image includes a color similar to the color with which the contour line or the mask image is drawn, the range of the contour line and the mask image becomes unclear. Thus, whether an area is sufficiently extracted is difficult to be determined, if not impossible. Conventionally, to deal with such a situation, the user has switched between displaying and non-displaying of the contour line or the mask image, to distinguish between the color of the contour line or the mask image with the color of the original image. In a system where the drawn color can be changed, the user himself or herself has selected a color with high visibility. However, such conventional methods impose an extra operation load on the user. Furthermore, when the original image includes various hues, an appropriate drawing color might be difficult to determine.

CITATION LIST

Non Patent Literature

NPL 1: Carsten Rother, Vladimir Kolmogorov and Andrew Blake, "GrabCut": interactive foreground extraction using iterated graph cuts, in proceedings of ACM SIGGRAPH 2004 Papers, pp. 309 to 314, 2004

NPL 2: O. Duchenne, J.-Y. Audibert, Fast interactive segmentation using color and textural information <http://imagine.enpc.fr/%7Eaudibert/RR0626.pdf>, CERTIS Technical report 06 to 26, 2006

NPL 3: Interactive image segmentation by maximal similarity based region merging, Jifeng Ning, Lei Zhang, David Zhan, Chengke Wu. Pattern Recognition 43 (2010) 445 to 456

SUMMARY

One or more embodiments of the present invention provides a technique of allowing a result of area extraction processing on any target image to be displayed with a highly visible color, without imposing an extra operation load on the user.

According to one or more embodiments of the present invention, when an extraction result is combined with an original image to be displayed, colors of a periphery of a boundary between a foreground and a background are picked up, and a color of an extraction result image is automatically determined so as to be as different as possible from the colors.

One or more embodiments of the present invention is a method for displaying a result of area extraction processing of dividing a target image into a foreground area and a background area. The method includes: a result acquisition step, in which a computer acquires a result of the area extraction processing on the target image; an extraction result image generation step, in which the computer generates an extraction result image representing an estimated foreground area or an estimated background area estimated by the area extraction processing or a boundary between the estimated foreground area and the estimated background area, based on the acquired result; and a display step, in which the computer generates a composite image by combining the extraction result image with the target image, and displays the composite image on a display device. The extraction result image generation step includes: a color extraction step of extracting a plurality of colors, which are all or representative colors, from a pixel group in a boundary peripheral area including the boundary between the estimated foreground area and the estimated background area, and disposed on both the estimated foreground area and the estimated background area; and a color determination step of determining a color of the extraction result image so as to be as different as possible from each of the plurality of colors extracted in the color extraction step.

By thus determining the displaying color of the extraction result image, when the extraction result image is combined with the target image, the color of the target image is clearly distinguished from the color of the extraction result image, at least in the boundary peripheral area. Thus, the outer edge of the extraction result image, that is, the boundary between the estimated foreground area and the estimated background area, can be visually recognized clearly. Thus, whether the extracted area matches the area intended by the user can be easily determined. With the method, the optimum displaying color of the extraction result image is automatically selected, and thus no extra operation load is imposed on the user.

According to one or more embodiments of the present invention, the extraction result image is an image in which the estimated foreground area or the estimated background area is filled with the color determined in the color determination step, and the composite image is an image in which the extraction result image with a predetermined transmittance is overlaid on the target image. With such an overlay display, whether the estimated foreground area matches the area intended by the user can be determined at a glance.

According to one or more embodiments of the present invention, a contour line of a filled area in the extraction result image is drawn in the composite image. With the contour line, the boundary is more clearly defined between the estimated foreground area and the estimated background area. The contour line may be drawn in any color, as long as the contour line can be distinguished from the filled area. For example, the contour line may be drawn with a color that is same as a color of the filled area and with a lower transmittance than the filled portion. The contour line may be drawn with a color having a same hue as a color of the filled area, and having at least one of intensity and brightness different from the color of the filled area. Alternatively, in the color determination step, two colors different from each other may be hue are selected so as to be as different as possible from any one of the plurality of colors extracted in the color extraction step, and one of the two determined colors may be used as a filling color of the filled area in the extracted result image, and the other one of the two determined colors is used as a color of the contour line of the filled area.

According to one or more embodiments of the present invention, a thickness of the contour line is determined in accordance with a display resolution of the display device. Thus, excellent visibility can be secured for the display device with any level of display resolution. According to one or more embodiments of the present invention, a thickness of the contour line is determined in accordance with an image size of the target image.

According to one or more embodiments of the present invention, in the composite image, the color or the transmittance of the filled area in the extraction result image differs between portions respectively close to or far from the contour of the filled area, or changes towards the portion far from the contour from the portion close to the contour. Thus, the portion close to the contour relatively stands out, whereby a visual effect that the outer edge of the extraction result image becomes clearer can be obtained.

The following display mode, other than the overlay display, can be employed. For example, according to one or more embodiments of the present invention, the extraction result image is an image in which the boundary line between the estimated foreground area and the estimated background area be drawn with the color determined in the color determination step. Whether the extracted area matches the area intended by the user can also be checked by thus displaying only the boundary line. In this case also, by determining a thickness of the boundary line in accordance with a display resolution of the display device, excellent visibility can be secured for the display device with any level of display resolution. A thickness of the boundary line may also be determined in accordance with an image size of the target image.

Alternatively, to display only an estimated foreground area as the extraction result image, a mask image for masking other areas may be used. Here, a plurality of colors, which are all colors or representative colors, may be extracted from a pixel group in a boundary peripheral area at least including a portion of the estimated foreground area, adjacent to an estimated background area, and a color of the mask image may be determined so as to be as different as possible from each of the plurality of colors extracted. Here, the boundary peripheral area may include "a portion of the estimated foreground area, adjacent to the estimated background area". Alternatively, the configuration where "a portion of the estimated background area, adjacent to the estimated foreground area" is included may be employed. Thus, whether the estimated foreground area is sufficiently extracted can be easily checked in detail.

To display only an estimated background area as the extraction result image, a mask image for masking other areas may be used. Here, a plurality of colors, which are all colors or representative colors, may be extracted from a pixel group in a boundary peripheral area at least including a portion of the estimated background area, adjacent to an estimated foreground area, and a color of the mask image may be determined so as to be as different as possible from each of the plurality of colors extracted. Here, the boundary peripheral area may include "a portion of the estimated background area, adjacent to the estimated foreground area". Alternatively, the configuration where "a portion of the estimated foreground area, adjacent to the estimated background area" is included may be employed. Thus, whether the estimated background area is sufficiently extracted can be easily checked in detail.

According to one or more embodiments of the present invention, in the color determination step, the color of the extraction result image is determined in such a manner as to have a largest sum of absolute values of color differences from the plurality of colors extracted in the color extraction step. Alternatively, according to one or more embodiments of the present invention, in the color determination step, the color of the extraction result image is determined to have a hue at a portion, in a hue cycle in which the plurality of colors extracted in the color extraction step are mapped, where mapping points are most sparsely arranged. In the latter case, any brightness and intensity of the extraction result image may be set.

According to one or more embodiments of the present invention, in the display step, displaying and non-displaying of the extraction result image are automatically switched at a predetermined period. With the displaying and non-displaying of the extraction result image being switched, the target image can be compared with the extraction result more in detail. Moreover, in this method, the displaying and non-displaying are automatically switched, whereby no operation load is imposed on the user.

One or more embodiments of the present invention a method for displaying an area extraction result, including at least one of the processes described above, and may be regarded as an area extraction method including the display method. One or more embodiments of the present invention is a program for causing a computer to execute the steps in the methods, or as a storage medium recording the program. One or more embodiments of the present invention is an image processing apparatus or an area extraction device including at least one of means that executes the processing.

One or more embodiments of the present invention is a result of area extraction processing on any target image can be displayed with a highly visible color, without imposing an extra operation load on a user.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. One or more embodiments of the present invention relates to a method for displaying a result of area extraction processing (also referred to as segmentation or area segmentation processing) of dividing a target image into a foreground area and a background area, in an easily recognizable manner. The area extraction processing has been used in various fields such as, for example, processing of extracting an area of an inspection target object in an original image in image inspection, processing of trimming only a foreground portion from the original image when background composition is performed in image editing, and processing of extracting only a diagnosed organ or portion, from a medical image. One or more embodiments of the present invention can be applied to any system that uses the area extraction processing.

First Embodiment (Apparatus Configuration)

Figure 1:
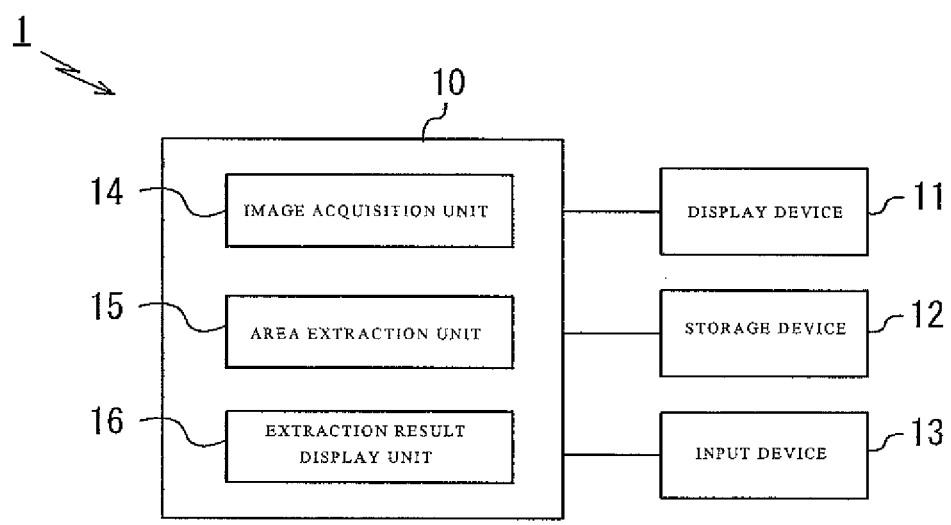
FIG. 1 is a diagram schematically showing the configuration of an image processing apparatus having an area extraction function.

FIG. 1 schematically shows the configuration of an image processing apparatus having an area extraction function.

An image processing apparatus 1 includes hardware such as an apparatus main body 10, a display device 11, a storage device 12, and an input device 13. The display device 11 is a device for displaying an image as a target of the area extraction processing, the result of extraction processing, a GUI screen related to the area extraction processing, and the like. For example, a liquid crystal display and the like can be used as the display device 11. The storage device 12 is a device for storing image data, processing result, and the like. For example, an HDD, an SSD, a flash memory, and a network storage may be used as the storage device 12. The input device 13 is a device operated by a user to input an instruction to the apparatus main body 10. For example, a mouse, a keyboard, a touch panel, a dedicated console, and the like can be used as the input device 13.

The apparatus main body 10 may be formed of a computer including, as hardware, a CPU (central processing unit), a main storage device (RAM), and an auxiliary storage device (ROM, HDD, SSD, or the like). The apparatus main body 10 includes, as functions, an image acquisition unit 14, an area extraction unit 15, and an extraction result display unit 16. The functions are implemented when a computer program stored in the auxiliary storage device or the storage device 12 is loaded onto the main storage device, and executed by the CPU. FIG. 1 shows merely an example of the apparatus configuration. All or a part of the display device 11, the storage device 12, and the input device 13 may be integrated with the apparatus main body 10. The apparatus main body 10 may be formed of a computer such as a personal computer or a slate terminal, or may be formed of a dedicated chip, an onboard computer, or the like.

(Area Extraction Processing)

Figure 2:
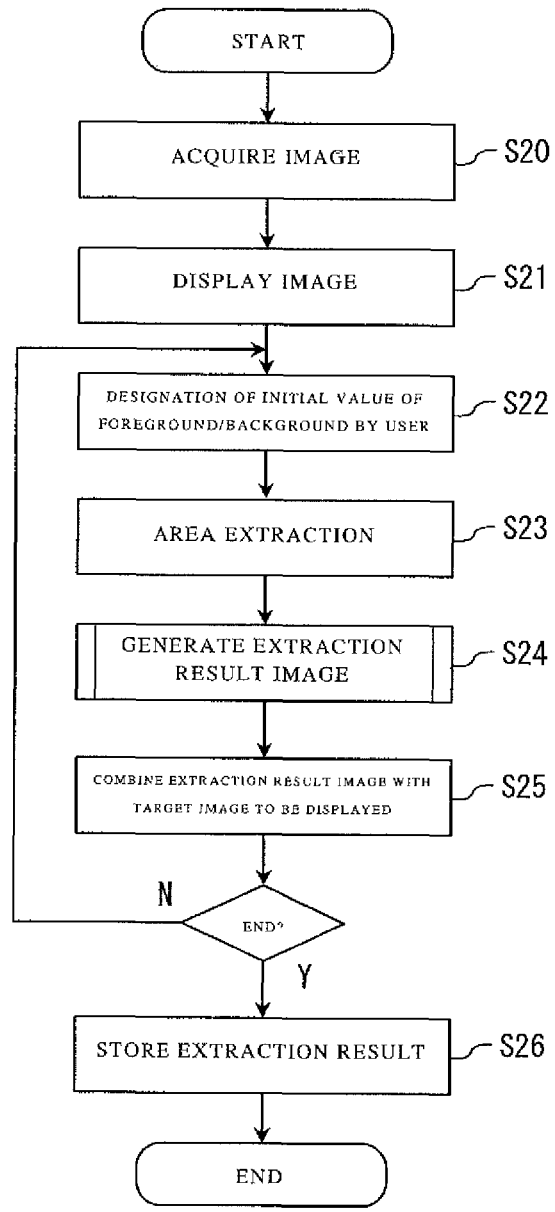
FIG. 2 is a flowchart of area extraction processing.
Figure 3:
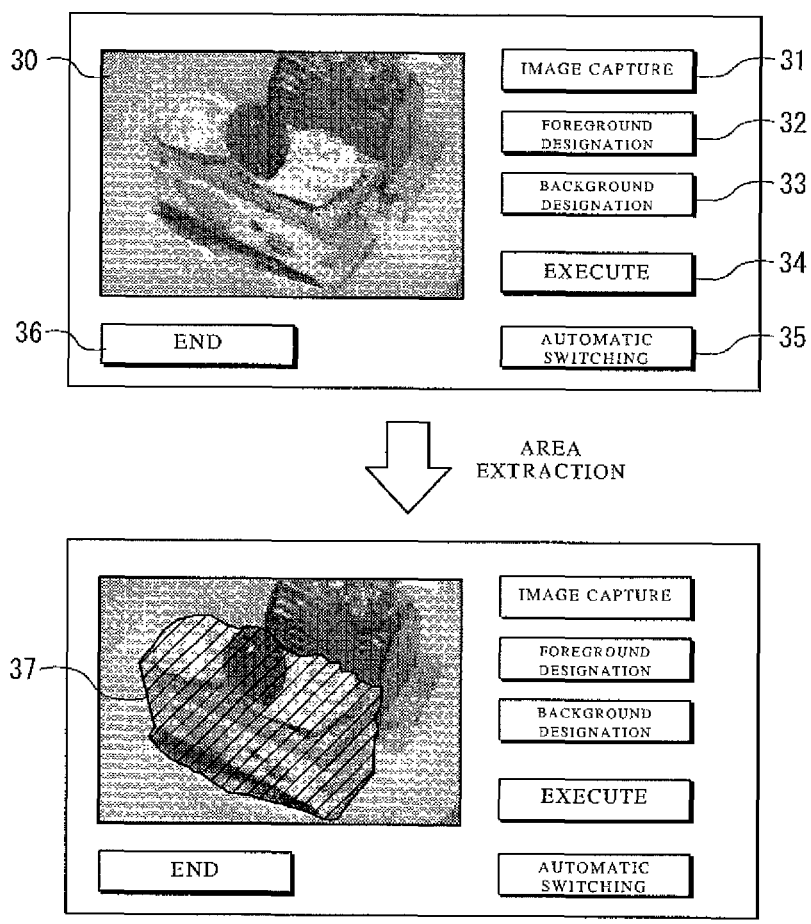
FIG. 3 is a diagram showing an example of an operation screen for the area extraction processing.

A flow of entire area extraction processing is described by referring to FIGS. 2 and 3. FIG. 2 is a flowchart of the area extraction processing and FIG. 3 is an operation screen for the area extraction processing.

When the area extraction function is started, the operation screen in FIG. 3 is displayed on the display device 11. The operation screen includes an image window 30, an image acquisition button 31, a foreground designation button 32, a background designation button 33, an execution button 34, an automatic switching button 35, and an end button 36. Button selection and foreground/background designation described later can be performed with the input device 13. The operation screen is merely an example, and any UI can be used as long as an input operation and checking of an image and an extraction result described later can be performed.

When the user presses the image acquisition button 31, the image acquisition unit 14 reads an original image (target image) as a target of the processing (Step S20). A possible device, from which image data is acquired, includes, for example, an auxiliary storage device of the apparatus main body 10, the storage device 12, another computer, a network storage, a camera, a scanner, and the like. When required, the image acquisition unit 14 performs processing of allowing a user to select the device, from which data is acquired, and data to be acquired.

The image acquired in Step S20 is displayed on the image window 30 of the operation screen, as shown in the upper section in FIG. 3 (Step S21).

In Step S22, the area extraction unit 15 allows the user to designate initial values of a foreground and a background. To designate the initial value of the foreground, the user presses the foreground designation button 32 on the operation screen, to activate a foreground designation mode, and then designates a portion to be the foreground, on an image displayed on the image window 30. The object of the designation herein is to pick up a representative color of the foreground, and the user may appropriately select a part of pixels or a pixel group of an object the user wants to extract, as the foreground. When the foreground includes a portion where a pattern, shade, or color largely varies, according to one or more embodiments of the present invention, the pixel group is selected in such a manner that the colors are covered as much as possible. For example, to extract only an area of a mille-feuille on a closer side, from the image shown in FIG. 3, pixels of a piecrust, a cream, and a strawberry may be designated. To input the initial value of the background, the user presses the background designation button 33 to switch the mode to a background designation mode, and then performs the similar processing. The initial values of the foreground and the background are not necessarily input. Any one of the foreground and the background may be input. When the representative color is known, or can be automatically calculated from the color distribution of an image and the like, Step S22 may be omitted.

When the user presses the execution button 34, the area extraction unit 15 applies the area extraction processing to the target image by using the foreground/background designated in Step S22 as the initial value (Step S23). A number of algorithms for the area extraction processing have been proposed, and the area extraction unit 15 can use any of the algorithms. Thus, the detailed description of the area extraction processing is omitted herein. The extraction result (area estimation result) obtained by the area extraction unit 15 is transmitted to the extraction result display unit 16. The extraction result may be of any data format. For example, a bitmask with different labels respectively on the foreground area and the background area, and vector data expressing the boundary between the foreground area and the background area with a Bezier curve or a spline curve, may be used.

The extraction result display unit 16 generates an extraction result image based on information acquired in Step S23 (Step S24), generates a composite image by combing the extraction result image with the target image, and displays the composite image on the display device 11 (Step S25). The lower section of FIG. 3 shows an example where an extraction result image 37 (hatched portion) is overlaid on the target image to be displayed. By looking at such a composite image, the user can check whether the intended portion (the portion of the mille-feuille) is sufficiently extracted as a foreground area, that is, whether there is a mismatch between intended portion and the extraction result image. A method of displaying the extraction result will be described in detail later.

When the user presses the automatic switching button 35 while the extraction result image is being displayed, the extraction result display unit 16 automatically switches between displaying and non-displaying of the extraction result image at a predetermined period (every few seconds, for example). Specifically, the extraction result display unit 16 alternately switches between the screens on the lower and the upper sections in FIG. 3. With the displaying and non-displaying of the extraction result image being switched, the target image can be compared with the extraction result more in detail. Moreover, in this method, the displaying and non-displaying are automatically switched, whereby no operation load is imposed on the user.

Then, when the user presses the end button 36, the area extraction unit 15 stores data on the extraction result in the storage device 12 (Step S26), and the processing is terminated. If the result of the area extraction processing in Step S23 is unsatisfactory, the area extraction processing may be stared over after designating the foreground/background again (Step S22), adjusting other parameters (not illustrated), and the like. According to one or more embodiments of the present invention, in the screen shown in the lower section of FIG. 3, an interface, allowing a user to manually correct the boundary of the foreground area, is provided.

(Extraction Result Displaying)

Figure 4:
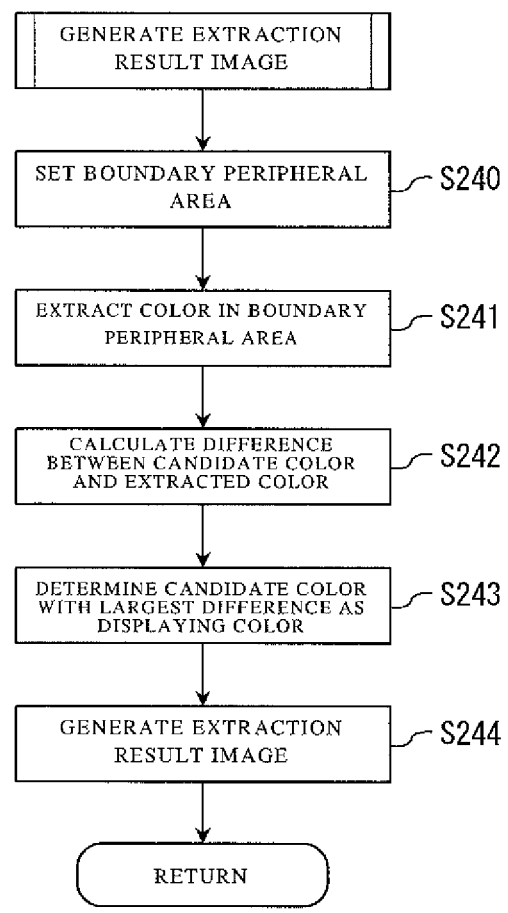
FIG. 4 is a flowchart showing extraction result image generation processing in a first embodiment in detail.
Figure 5:
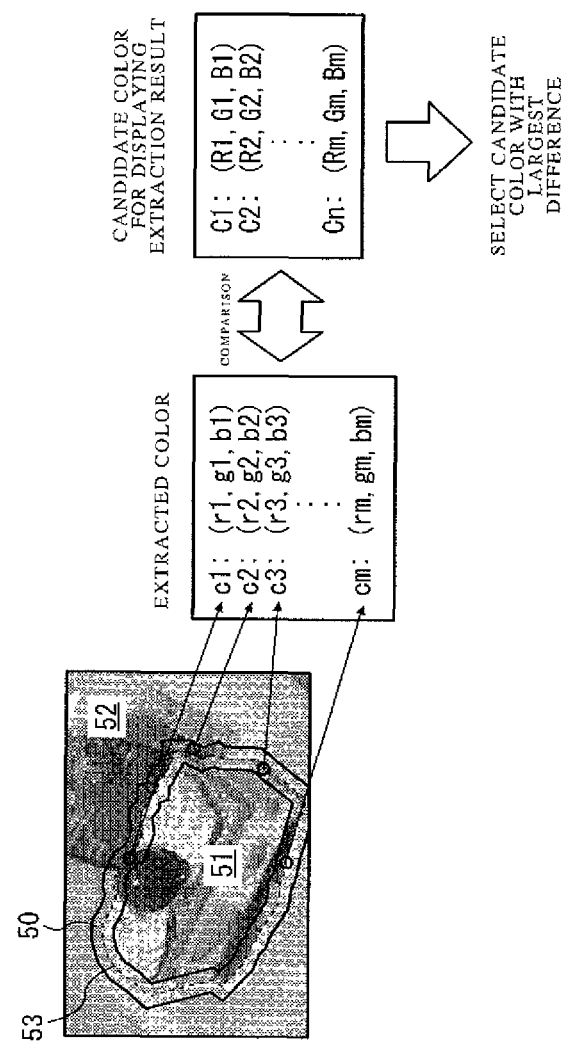
FIG. 5 is a diagram for describing an algorithm for determining a displaying color of an extraction result image in the first embodiment.

A method of displaying the extraction result in the first embodiment is described by referring to FIGS. 4 and 5. FIG. 4 is a flowchart showing, in detail, the extraction result image generation processing shown in Step S24 in FIG. 2. FIG. 5 is a diagram for explaining an algorithm for determining the displaying color of the extraction result image. The foreground area estimated by the area extraction processing is referred to as "estimated foreground area", and the background area estimated by the area extraction processing is referred to as "estimated background area".

The extraction result display unit 16 sets a boundary peripheral area on the target image, based on the extraction result acquired in Step S23 (Step S240). As shown in FIG. 5, a boundary peripheral area 50 includes a boundary 53 (dashed line portion) between an estimated foreground area 51 and an estimated background area 52, and is set to be disposed on both the estimated foreground area 51 and the estimated background area 52. In the first embodiment, the boundary peripheral area 50 is of a range having a predetermined width (total of 10 pixel width with 5 pixels on each of the foreground side and the background side, for example) with the boundary 53 at the center.

Then, the extraction result display unit 16 sequentially examines pixel groups in the boundary peripheral area 50, and extracts all the colors included in the boundary peripheral area 50 (Step S241). For the processing in FIG. 4, any color space can be used for the calculation. In the first embodiment, an RGB image is used as the target image, and pixel values (RGB value) of the image is directly used in the calculation. In FIG. 5, (r1, g1, b1), (r2, g2, b2), ..., (rm, gm, bm) represent m colors, which are hereinafter referred to as extracted colors c1 to cm, extracted from the boundary peripheral area 50. In the first embodiment, candidates of colors that can be selected as the displaying color of the extraction result image are prepared in advance. In FIG. 5, (R1, G1, B1), (R2, G2, B2), ..., (Rn, Gn, Bn) represent n candidate colors C1 to Cn.

Then, the extraction result display unit 16 calculates the differences between each of the n candidates colors C1 to Cn and the m extracted colors c1 to cm (Step S242). Here, as shown in the following formula, the sum of absolute values of color differences ΔE(Ci, ck) between a certain candidate color Ci and each of the m extracted colors c1 to cm is defined as a difference Di between the candidate color Ci and the m extracted colors c1 to cm. The color difference is obtained from a distance on a color space.

$$Di = \sum_{k=1}^{m} |\Delta E(Ci, ck)|$$

$$= \sum_{k=1}^{m} \sqrt{(Ri - rk)^2 + (Gi - gk)^2 + (Bi - bk)^2}$$

$$(i = 1, 2, \ldots, n)$$

[Formula 1]

The extraction result display unit 16 selects the candidate color with the largest difference Di as the displaying color of the extraction result image (Step S243). Thus, a color as different as possible from each of the colors in the boundary peripheral area is selected as the displaying color.

Then, the extraction result display unit 16 generates, as the extraction result image, an image obtained by filling the estimated foreground area with the displaying color determined in Step S243 (Step S244). Here, an α channel of the extraction result image is set in such a manner as to make the estimated foreground area (filled area) semitransparent (for example, transmittance: 50%), and the estimated background area transparent (transmittance: 100%). The extraction result image generated through the processing described above is combined with the target image in Step S25 in FIG. 2 (α blend).

Figure 6:
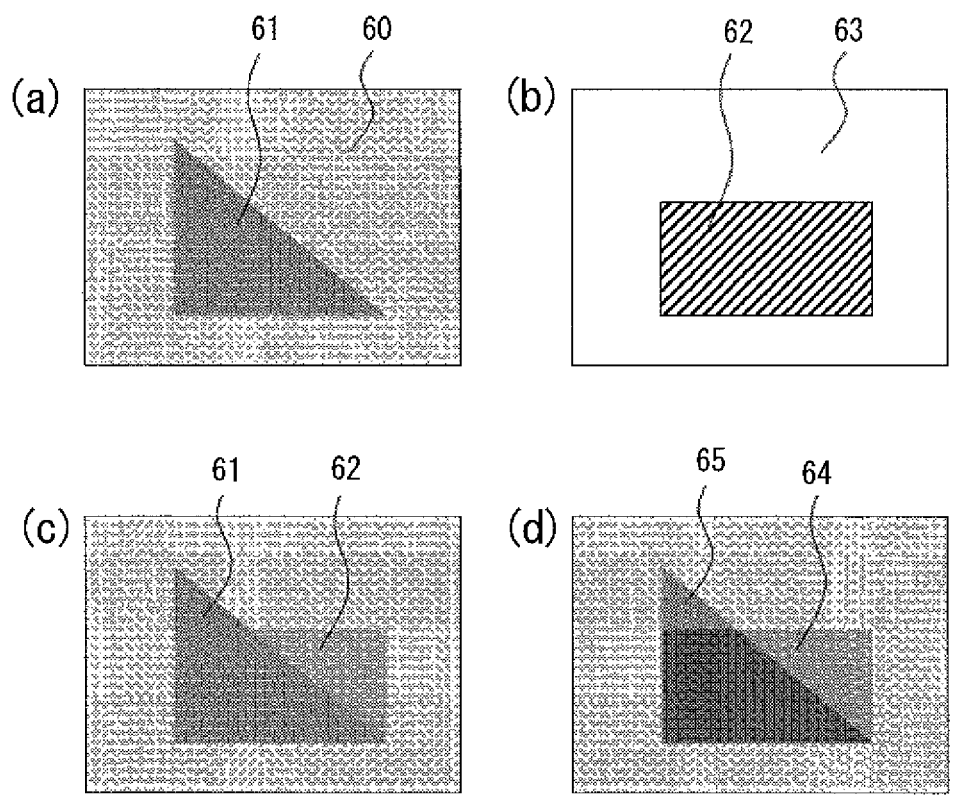
FIGS. 6(a)-6(d) are schematic diagrams for describing an effect of an extraction result display method in the first embodiment.

FIGS. 6(a)-6(d) schematic diagrams for describing the effect of the extraction result display method of the first embodiment. FIG. 6(a) is the target image and a red triangular object 61 is disposed in a cyan background 60. It is assumed here that the object is to extract the triangular object 61 as the foreground from the image. FIG. 6(b) shows an example of an estimated foreground area 62 and an estimated background area 63 obtained by the area extraction processing. Here, a rectangular object, which is different from the foreground area (triangular object 61) intended by the user, is extracted as the estimated foreground area 62.

FIG. 6(c) shows a conventional example where a semitransparent image, having the estimated foreground area 62 filled with a predetermined displaying color (magenta), is overlaid to be displayed. Here, it can be seen that, because the displaying color is similar to the color of the triangular object 61, the range of the estimated foreground area 62 is difficult to visually recognize.

FIG. 6(d) shows a display example of a case where a displaying color obtained by the method of the first embodiment is used. A color different from both the color of the background 60 of the target image and the color of the triangular object 61, is selected as the displaying color. Thus, each of the background 60 of the target image, the triangular object 61, and the extracted estimated foreground area 62 can be visually recognized clearly. Therefore, an excess portion 64 of the estimated foreground area 62, and a lacking portion 65 of the estimated foreground area 62 can be recognized. Thus, whether the extracted estimated foreground area 62 matches the triangular object 61, which is the foreground area intended by the user, can be checked at a glance.

It is a matter of course that the same effect can be obtained with an image including a number of colors, such as an image captured by a camera, unlike the simple image shown in FIGS. 6(a)-6(d). Specifically, by determining the displaying color of the extraction result image with the method of the first embodiment, when the extraction result image is combined with the target image, the color of the target image is clearly different from the color of the extraction result image, at least in the boundary peripheral area. Thus, the outer edge of the extraction result image, that is, the boundary between the estimated foreground area and the estimated background area, can be visually recognized clearly. Thus, whether the extracted area matches the area intended by the user can be easily determined. With the method, the optimum displaying color of the extraction result image is automatically selected, and thus no extra operation load is imposed on the user.

Furthermore, there is also a feature that the displaying color of the extraction result image is determined through comparison with only the color in the boundary peripheral area, rather than referring to the colors of the entire target image. For example, when the target image includes wide variety of hues, the color clearly different from all the hues cannot be set, and thus the displaying color of the extraction result image is inevitably similar with a part of the colors in the target image. When a pixel group with the similar color is in the contour of the extraction result image or the periphery of the contour, the outer edge of the extraction result image might be unclear. Regarding this point, by focusing on the boundary peripheral area as in the first embodiment, the number of colors as the comparison target can be largely reduced from a case where the entire target image is checked. Thus, the displaying color of the extraction result image can be set easier. Moreover, it is guaranteed that a color similar to the color of the extraction result image is at least not in the contour of the extraction result image or the periphery of the contour (that is, in the boundary peripheral area). Thus, the outer edge of the extraction result image can be prevented from being unclear. The color might be similar between the extraction result image and the target image on the outer side of the boundary peripheral area. Still, as long as the outer edge of the extraction result image is clear, whether the area is sufficiently extracted can be checked, and thus the similarity in color on the outer side of the boundary peripheral area would not be so much of an issue.

Second Embodiment

Next, a second embodiment of the present invention will be described. The second embodiment is different from the first embodiment, in which the displaying color is determined in such a manner as to have the largest sum of the absolute values of the color difference from the extracted color from the boundary peripheral area, in that the color most different from the extracted color from the boundary peripheral area in hue is selected as the displaying color. Specifically, only the content of the processing in Step S24 in the flow in FIG. 2 is replaced, and aside from this, the configuration and the processing are the same as those in the first embodiment.

Figure 7:
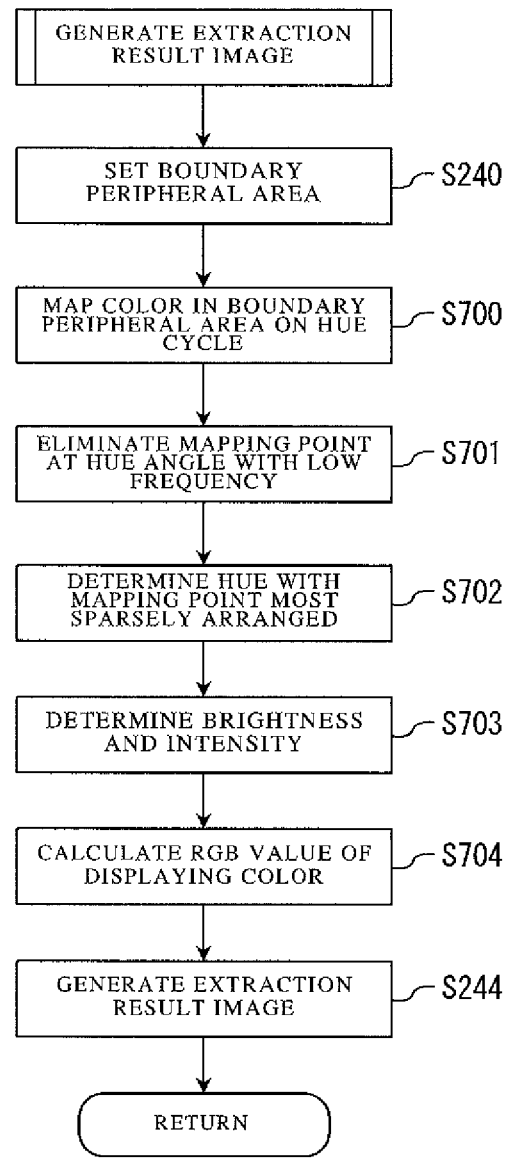
FIG. 7 is a flowchart showing extraction result image generation processing in a second embodiment in detail.
Figure 8:
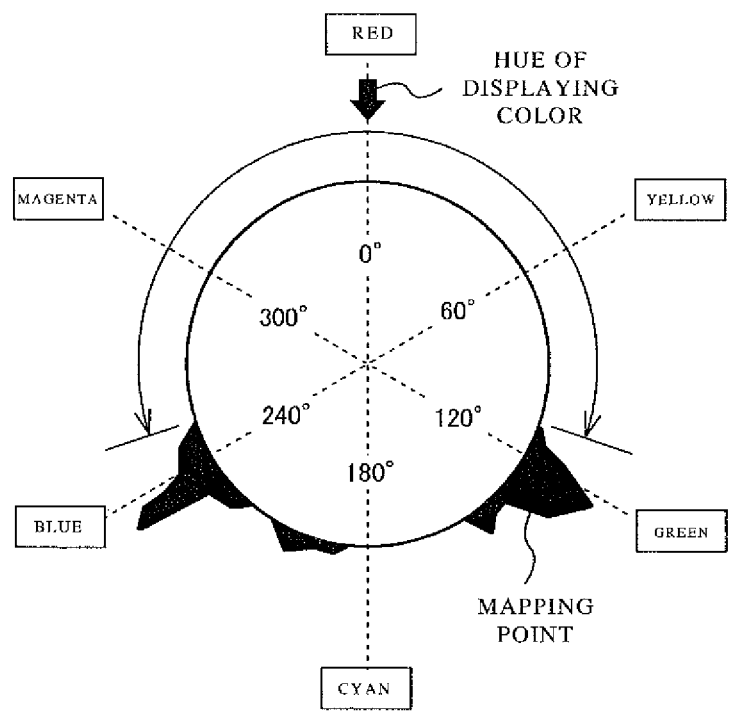
FIG. 8 is a diagram for describing an algorithm for determining a displaying color of an extraction result image in the second embodiment.

FIGS. 7 and 8 show a method for displaying an extraction result in the second embodiment. FIG. 7 is a flowchart showing, in detail, the extraction result image generation processing shown in Step S24 in FIG. 2. FIG. 8 is a diagram for describing an algorithm for determining the displaying color of the extraction result image. In the flow of FIG. 7, the processing that is the same as that in the flow in FIG. 4 in the first embodiment is denoted with the same step number.

The extraction result display unit 16 sets the boundary peripheral area through the processing similar to that in the first embodiment (Step S240).

Next, the extraction result display unit 16 calculates a hue angle H of each pixel in the boundary peripheral area 50, and maps the hue angle H on a hue cycle (Step S700). For example, the RGB value (r, g, b) of the pixel can be converted into the hue angle H with the following formula:

$$\tan H = \frac{\sqrt{3}\,(g-b)}{2r-g-b} \quad \text{[Formula 2]}$$

When all the points are mapped, the extraction result display unit 16 eliminates a mapping point at a hue angle with a low frequency (lower than a threshold) (Step S701). An example of a hue cycle histogram thus obtained is shown in FIG. 8. In the hue cycle histogram, the clockwise circumferential direction represents the hue angle 0 to 360° (with the position at 12 o'clock being 0°), and the outer side in the radial direction represents the frequency of a mapping point. It can be seen that the mapping points are concentrated at two positions, which are around the hue angle of 120° (green) and the hue angle of 240° (blue).

Then, the extraction result display unit 16 calculates a hue at a portion where the mapping points are most sparsely arranged on the hue cycle histogram (Step S702). For example, the widest range in the hue range including no mapping point is detected, and the hue at the center of the range may be obtained. In the example of FIG. 8, the hue range from approximately 240° to 0° and from 0° to approximately 120° is most widely opened, and thus approximately 0° (red) at the center of the range is selected as the hue of the displaying color.

Then, the extraction result display unit 16 determines the brightness and the intensity of the displaying color (Step S703). Through the experiments, the present inventors have found that the difference in the hue has the largest effect in improving the visibility, and the brightness and the intensity do not largely affect the visibility (as long as the brightness and the intensity are not extremely low). Thus, the brightness and the intensity may be set to a certain level. For example, the brightness and the intensity of the displaying color may be set to fixed values. Alternatively, the average brightness and the average intensity of the pixels in the boundary peripheral area may be calculated, and the brightness and the intensity of the displaying color may be determined so as to be as different as possible from the average brightness and the average intensity (but with the lower limit values of the brightness and the intensity determined in advance).

Next, the extraction result display unit 16 calculates the RGB value of the displaying color from the hue/brightness/intensity determined in Steps S702 and S703 (Step S704). Then, the extraction result display unit 16 generates the extraction result image as in the first embodiment (Step S244), and overlays the extraction result image on the target image to be displayed.

The method described above provides the following advantage in addition to the same advantageous effect provided by the first embodiment. Specifically, the hue in complementary color relationship with the hue included in the boundary peripheral area is selected as the hue of the displaying color. Thus, the display can be performed with visibility higher than that in the method of the first embodiment. The hue with a low frequency is eliminated in Step S701, and the hue of the displaying color is determined through the comparison with a representative (dominant) hue in the boundary peripheral area. Thus, an appropriate displaying color with excellent visibility can be obtained even from an image including noise and image including various hues.

Third Embodiment

Next a third embodiment of the present invention will be described. In the first and the second embodiments, the filled area (estimated foreground area) is overlaid on the target image to be displayed. In addition, the contour line of the filled area is drawn in the third embodiment.

Figure 9:
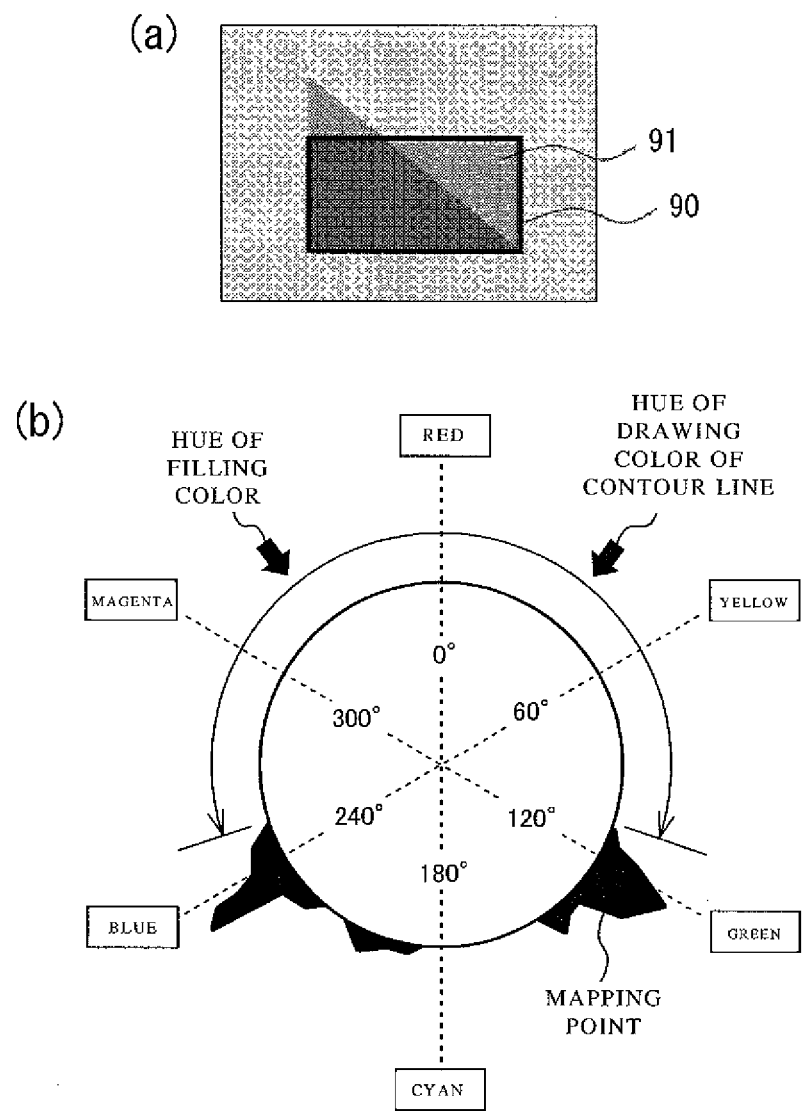
FIGS. 9(a)-9(b) are diagrams for describing a display method of a third embodiment.

FIG. 9(*a*) shows a display example of extraction result image including the filled area provided with the contour line. By thus drawing such a contour line 90, the boundary between the estimated foreground area and the estimated background area becomes clearer. This is particularly effective when the boundary between the estimated foreground area and the estimated background area has a complicated shape or is intricate.

Examples of a method for determining the drawing color of the contour line 90 include the followings.

(1) The color that is the same as the filling color of the filled area 91 is used as the drawing color of the contour line 90, with the transmittance when combined with the target image differing between the filled area 91 and the contour line 90. Because it is better when the contour line 90 has higher visibility, the transmittance of the contour line 90 is lower than that of the filled area 91, and is typically 0.

(2) The color that is the same as the filling color of the filled area 91 in hue but is different from the filling color in at least one of the brightness and the intensity is used as the drawing color of the contour line 90. Here, the brightness and the intensity of the drawing color of the contour line 90 may be determined based on the average brightness and the average intensity of the boundary peripheral area. For example, the contour line 90 with low brightness stands out when the boundary peripheral area has high average brightness (includes many bright pixels), and the contour line 90 with high brightness stands out when the boundary peripheral area has low average brightness.

(3) The drawing color of the contour line 90 is determined, when the filling color is determined with the method of the first or the second embodiment. With the method of the first embodiment, the candidate with the largest difference Di may be selected as the filling color, and the candidate with the second largest difference Di may be selected as the drawing color of the contour line. With the method of the second embodiment, as shown in FIG. 9(*b*), the largest range, in the hue range, without the mapping point is detected, and one of the two hues, selected in such a manner as to equally divide the hue range in three, may be used as the filling color, and the other one may be used as the drawing color of the contour line. In the example of FIG. 9(*b*), the hue range from approximately 240° to 0° and from 0° to approximately 120° is most widely opened, and thus two hues at approximately 320° and approximately 40° are selected. Through such methods, the contour line 90 and the filled area 91 can be set to have a highly visible color.

The contour line 90 may be set to have any thickness (number of pixels). However, when the contour line 90 is too thick, there is an adverse effect that the shape of the estimated foreground area is difficult to recognize. Thus, the thickness may be set to about 1 to 10 pixels. The thickness of the contour line 90 may be determined according to the display resolution of the display device. Specifically, the number of pixels is set to be relatively small for the display device with a low resolution, and set to be relatively large for the display device with a high resolution. Thus, excellent visibility can be secured for the display device with any level of display resolution. Alternatively, the thickness of the contour line 90 may be determined in accordance with the image size of the target image. Specifically, a relatively small number of pixels are set when the image size is small, and a relatively large number of pixels are set when the image size is large. Thus, excellent visibility can be secured, regardless of the image size of the target image.

Fourth Embodiment

Figure 10:
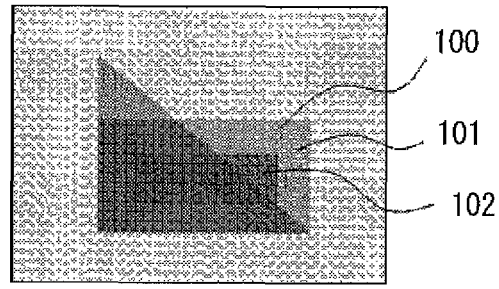
FIGS. 10(a)-10(e) are diagrams for describing a display method of a fourth embodiment.
Figure 10:
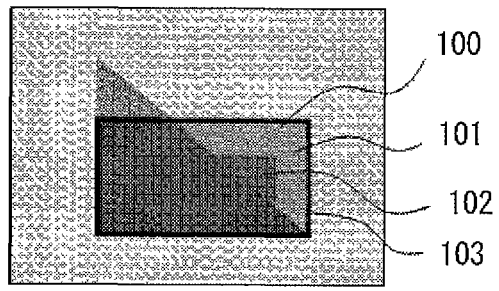
Figure 10:
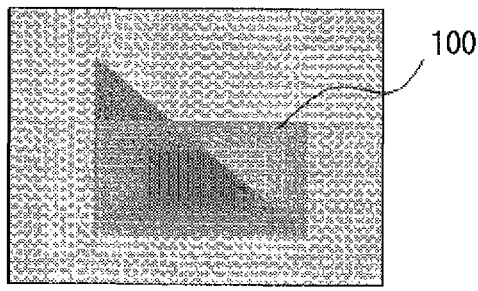

FIGS. 10(*a*)-10(*c*) show a fourth embodiment of the present invention. FIG. 10(*a*) is a display example where the color of a filled area 100 in the extraction result image differs between a portion 101 and a portion 102 respectively close to and far from the contour of the filled area 100. For example, the intensity and the brightness of the portion 101 close to the contour may be set to be relatively high, without changing the hue. By thus changing the color in the filled area 100, the portion 101 close to the contour relatively stands out, whereby a visual effect that the outer edge of the extraction result image is more clarified can be obtained. FIG. 10(*b*) is a display example where a contour line 103 is further drawn in FIG. 10(*a*). Thus, even higher visibility can be achieved. In FIGS. 10(*a*) and (*b*) the color variation in two stages is employed. Alternatively, the color variation in three stages or more may be employed, or the color may be changed continuously. FIG. 10(*c*) is a display example where the color continuously changes from a portion close to the contour to a portion far from the contour (gradation display). When the boundary between colors stands out, the user might mistakenly recognize the boundary as an edge or a pattern in the target image. Thus, the gradation display has an advantage that such faulty visual recognition can be prevented. The contour line may be drawn as in FIG. 10(b), also in the case of the gradation display. In the fourth embodiment, the filling color is changed. The same visual effect can be obtained by changing the transmittance set to the a channel without changing the color.

Fifth Embodiment

Figure 11:
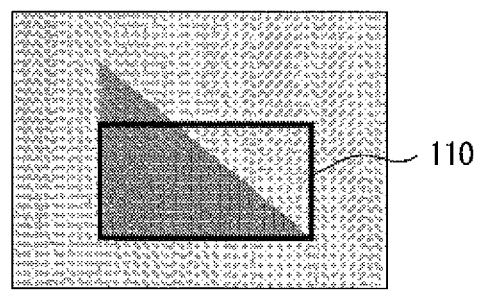
FIGS. 11(a)-11(b) are diagrams for describing a display method of a fifth embodiment.
Figure 11:
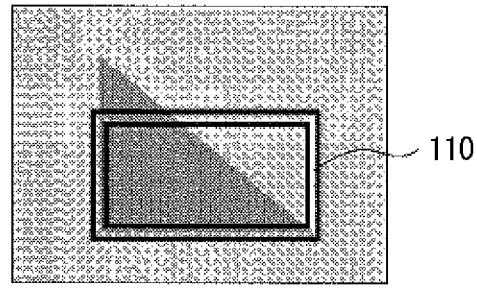

FIGS. 11(a)-11(b) show a fifth embodiment of the present invention. In the first to the fourth embodiments, the images having the foreground area filled are displayed. In the fifth embodiment, a display method of only drawing the boundary line between the foreground area and the background area is employed.

FIG. 11(a) is an example where a boundary line 110 is drawn with a single line. The drawing color of the boundary line 110 is set so as to be as different as possible from the color of a pixel group in the boundary peripheral area, through the method similar to those described in first or the second embodiments. By thus simply displaying the boundary line 110 as the extraction result image, the boundary between the foreground area and the background area can be visually recognized clearly, and thus whether the extracted area is appropriate can be checked. This method is particularly effective when the boundary between the estimated foreground area and the estimated background area has a complicated shape or is intricate. The boundary line 110 may have transmittance of 0% or may be displayed semi-transparently.

The boundary line 110 may be set to have any thickness (number of pixels). However, when the boundary line 110 is too thick, there is an adverse effect that the shape of the estimated foreground area is difficult to recognize. Thus, the thickness may be set to about 1 to 10 pixels. The thickness of the boundary line 110 may be determined according to the display resolution of the display device. Specifically, the number of pixels is set to be relatively small for the display device with a low resolution, and set to be relatively large for the display device with a high resolution. Thus, excellent visibility can be secured for the display device with any level of display resolution. Alternatively, the thickness of the boundary line 110 may be determined in accordance with the image size of the target image. Specifically, a relatively small number of pixels are set when the image size is small, and a relatively large number of pixels are set when the image size is large. Thus, excellent visibility can be secured, regardless of the image size of the target image.

FIG. 11(b) is an example where the boundary line 110 is drawn with two parallel lines. The two lines have an interval of several pixels in between, and are drawn in such a manner that the boundary, between the estimated foreground area and the estimated background area, is disposed right in the middle of the interval. With such a display method, not only the shape of the boundary line, but also the color of the pixel on the boundary line and the like can be recognized. Thus, whether the extracted area is appropriate can be more accurately determined. The two lines may be drawn with the same color/thickness. The two lines may be different from each other in color, transmittance, thickness, shape, (solid/dashed line), and the like. By thus distinguishing the line on the estimated foreground area side from the line on the estimated background area side with the latter method, there is an advantage that which of the areas, distinguished from each other by the boundary line, is the foreground can be easily determined.

Sixth Embodiment

Figure 12:
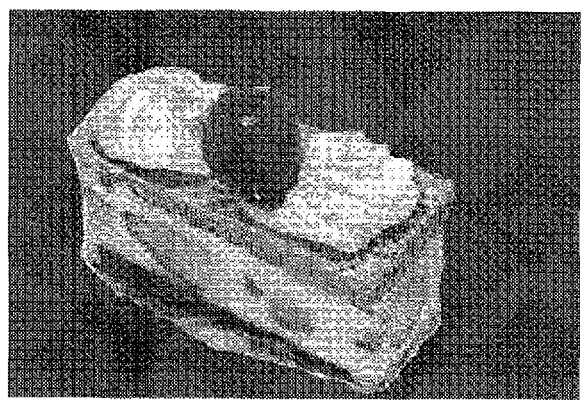
FIGS. 12(a)-12(b) are diagrams for describing a display method of a sixth embodiment.
Figure 12:
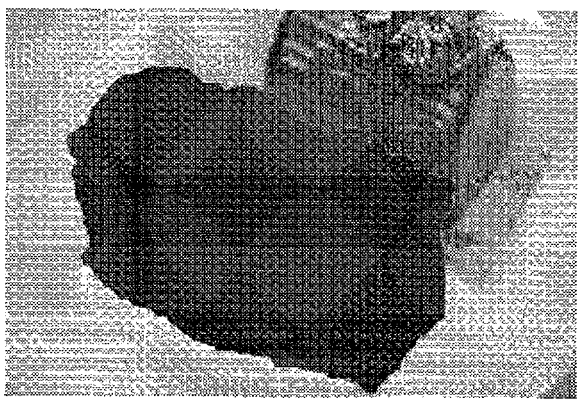

FIGS. 12(a)-12(b) show a sixth embodiment of the present invention. In the first to the fourth embodiments, the image, in which the estimated foreground area is filled, is overlaid to be displayed. In the sixth embodiment, a display method is employed in which the estimated background area (or the estimated foreground area) is masked so that only the estimated foreground area (or only the estimated background area) is displayed.

FIG. 12(a) is a display example where the estimated background area is masked. The color of the mask image (extraction result image) used herein is set so as to be as different as possible from the color of the pixel group in the boundary peripheral area, through the method that is the same as those described in the first and the second embodiments. Thus, a clear boundary is defined between the masked area and the estimated foreground area. Here, only the pixels of the estimated foreground area are displayed on the screen, and thus the excess portion of the estimated foreground area (a state where the pixel to be determined as the background area according to the intension of the user, is included in the estimated foreground area), can be more easily found.

FIG. 12(b) is a display example where the estimated foreground area is masked. The color of the mask image (extraction result image) used herein is also set through the method that is the same as those described in the first and the second embodiments. When only the pixels of the estimated background area are thus displayed, the lacking portion of the estimated foreground area (a state where the pixel to be determined as the foreground area according to the intension of the user, is included in the estimated background area), can be more easily found.

Other Embodiments

The embodiments described above each represent a specific example of the present invention, and there is no intension to limit the scope of the present invention to the specific embodiments. For example, in the first embodiment, the differences from all the colors included in the boundary peripheral area are calculated. Alternatively, the representative color in the boundary peripheral area can be reviewed as in the second embodiment. The boundary peripheral area needs not to have a uniform width. For example, the width may be larger at a portion where the boundary is intricate than a portion where the boundary is simple (straight boundary or the like) for the sake of visibility. In one or more of the embodiments described above, the boundary peripheral area is set with the boundary between the estimated foreground area and the estimated background area disposed at the center. However, the boundary is not necessarily disposed at the center. For example, when the filled image is overlaid on the estimated foreground area to be displayed, the width on the background area side may be wider, because distinction between the filled image and the estimated background area is more important. When the estimated foreground area and the mask image are combined with each other to be displayed as shown in FIG. 12(a), the boundary peripheral area may be set only on the estimated foreground area side, and thus the color of the mask image may be determined so as to be as different as possible from the color in the estimated foreground area in the periphery of the boundary. Conversely, when the estimated background area and the mask image combined with each other to be displayed as shown in FIG. 12(b), the boundary peripheral area may be set only on the estimated background area side.

In the first to the fourth embodiments, an image in which the foreground area is filled is used as the extraction result image. Conversely, an image in which the estimated background area is filled may be overlaid to be displayed as an extraction result image. According to one or more embodiments of the present invention, a user is allowed to freely select and switch between the displaying methods of the embodiments described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1: image processing apparatus
10: apparatus main body,
11: display device,
12: storage device,
13: input device,
14: image acquisition unit,
15: area extraction unit,
16: extraction result display unit
30: image window,
31: image acquisition button,
32: foreground designation button,
33: background designation button,
34: execution button,
35: automatic switching button,
36: end button,
37: extraction result image
50: boundary peripheral area,
51: estimated foreground area,
52: estimated background area,
53: boundary
60: background,
61: triangular object,
62: estimated foreground area,
63: estimated background area,
64: excess portion of estimated foreground area,
65: lacking portion of estimated foreground area
90: contour line,
91: filled area
100: filled area,
101: portion close to contour,
102 portion far from contour,
103: contour line
110: contour line

The invention claimed is:

1. A method for displaying a result of area extraction processing of dividing a target image into a foreground area and a background area, the method for displaying an area extraction result comprising:
a result acquisition step of acquiring a result of the area extraction processing on the target image;
an extraction result image generation step of acquiring an extraction result image representing an estimated foreground area or an estimated background area estimated by the area extraction processing or a boundary between the estimated foregound area and the estimated background area, based on the acquired result; and
a display step of generating a composite image by combining the extraction result image with the target image, and displaying the composite image on a display device,
wherein the extraction result image generation step comprises:
a color extraction step of extracting a plurality of colors, which are all or representative colors, from a pixel group in a boundary peripheral area including the boundary between the estimated foreground area and the estimated background area, and disposed on both the estimated foreground area and the estimated background area; and
a color determination step of selecting, as a color of the extraction result image, a color from candidates of colors so as to:
have a largest sum of color differences on a predetermined color space from all of the plurality of colors extracted in the color extraction step, or
have a largest hue difference from all of the plurality of colors extracted in the color extraction step.

2. The method for displaying an area extraction result according to claim 1,
wherein the extraction result image is an image in which the estimated foreground area or the estimated background area is filled with the color determined in the color determination step, and
wherein the composite image is an image in which the extraction result image with a predetermined transmittance is overlaid on the target image.

3. The method for displaying an area extraction result according to claim 2, wherein a contour line of a filled area in the extraction result image is drawn in the composite image.

4. The method for displaying an area extraction result according to claim 3, wherein the contour line is drawn with a color that is same as a color of the filled area and with a lower transmittance than the filled area.

5. The method for displaying an area extraction result according to claim 3, wherein the contour line is drawn with a color having a same hue as a color of the filled area, and having at least one of intensity and brightness different from the color of the filled area.

6. The method for displaying an area extraction result according to claim 3,
wherein, in the color determination step, two colors are selected from the candidates of colors so as to have a first and a second largest sum of color differences on the predetermined color space from all of the plurality of colors extracted in the color extraction step, and
wherein one of the two selected colors is used as a filling color of the filled area in the extraction result image, and the other one of the two determined colors is used as a color of the contour line of the filled area.

7. The method for displaying an area extraction result according to claim 3, wherein a thickness of the contour line is determined in accordance with a display resolution of the display device or an image size of the target image.

8. The method for displaying the area extraction result according to claim 2, wherein, in the composite image, the color or the transmittance of the filled area in the extraction result image differs between portions respectively close to or far from the contour of the filled area, or changes towards the portion far from the contour from the portion close to the contour.

9. The method for displaying an area extraction result according to claim 1,
wherein the extraction result image is an image in which the boundary line between the estimated foreground area and the estimated background area is drawn with the color determined in the color determination step, and
wherein a thickness of the boundary line is determined in accordance with a display resolution of the display device or an image size of the target image.

10. A method for displaying a result of area extraction processing of dividing a target image into a foreground area and a background area, the method for displaying an area extraction result comprising:
a result acquisition step of acquiring a result of the area extraction processing on the target image;
an extraction result image generation step of generating, to display only an estimated foreground area estimated by the area extraction processing, a mask image for masking other areas based on the acquired result; and
a display step of generating a composite image by combining the mask image with the target image, and displaying the composite image on a display device,
wherein the extraction result image generation step comprises:
a color extraction step of extracting a plurality of colors, which are all or representative colors, from a pixel group in a boundary peripheral area at least including a portion of the estimated foreground area, adjacent to an estimated background area; and
a color determination step of selecting, as a color of the mask image, a color from candidates of colors so as to:
have a largest sum of color differences on a predetermined color space from all of the plurality of colors extracted in the color extraction step, or
have a largest, hue difference from all of the plurality of colors extracted in the color extraction step.

11. A method for displaying a result of area extraction processing of dividing a target image into a foreground area and a background area, the method for displaying an area extraction result comprising:
a result acquisition step of acquiring a result of the area extraction processing on the target image;
an extraction result image generation step of generating, to display only an estimated background area estimated by the area extraction processing, a mask image for masking other areas based on the acquired result; and
a display step of generating a composite image by combining the mask image with the target image, and displaying the composite image on a display device,
wherein the extraction result image generation step comprises:
a color extraction step of extracting a plurality of colors, which are all or representative colors, from a pixel group in a boundary peripheral area at least including a portion of the estimated background area, adjacent to an estimated foreground area; and
a color determination step of selecting, as a color of the mask image, a color from candidates of colors so as to:
have a largest sum of color differences on a predetermined color space from all of the plurality of colors extracted in the color extraction step, or
have a largest hue difference from all of the plurality of colors extracted in the color extraction step.

12. The method for displaying an area extraction result according to claim 1, wherein in the color determination step, the color of the extraction result image is selected from the candidates of colors in such a manner as to have a largest sum of absolute values of color differences from the plurality of colors extracted in the color extraction step.

13. The method for displaying an area extraction result according to claim 1, wherein in the color determination step, the color of the extraction result image is selected from the candidates of colors so as to have a hue at a portion, in a hue cycle in which the plurality of colors extracted in the color extraction step are mapped, where mapping points are most sparsely arranged.

14. The method for displaying an area extraction result according to claim 1, wherein in the display step, displaying and non-displaying of the extraction result image are automatically switched at a predetermined period.

15. A non-transitory computer-readable medium storing a program that causes a computer to perform a method for displaying a result of area extraction processing of dividing a target image into a foreground area and a background area, comprising:
a result acquisition step of acquiring a result of the area extraction processing on the target image;
an extraction result image generation step of acquiring an extraction result image representing an estimated foreground area or an estimated background area estimated by the area extraction processing or a boundary between the estimated foreground area and the estimated background area, based on the acquired result; and
a display step of generating a composite image by combining the extraction result image with the target image, and displaying the composite image on a display device,
wherein the extraction result image generation step comprises:
a color extraction step of extracting a plurality of colors, which are all or representative colors, from a pixel group in a boundary peripheral area including the boundary between the estimated foreground area and the estimated background area, and disposed on both the estimated foreground area and the estimated background area; and
a color determination step of selecting, as a color of the extraction result image, a color from candidates of colors so as to:
have a largest sum of color differences on a predetermined color space from all of the plurality of colors extracted in the color extraction step, or
have a largest hue difference from all of the plurality of colors extracted in the color extraction step.

16. An image processing apparatus configured to generate an image for displaying a result of area extraction processing of dividing a target image into a foreground area and a background area, the apparatus comprising:
a result acquisition section that acquires a result of the area extraction processing on the target image;
an extraction result image generation section that generates an extraction result image representing an estimated foreground area or an estimated background area estimated by the area extraction processing or a boundary between the estimated foreground area and the estimated background area, based on the acquired result; and an output section that generates a composite image by combining the extraction result image with the target image, and outputs the composite image to a display device, wherein the extraction result image generation section comprises:

a color extraction section that extracts a plurality of colors, which are all colors or representative colors, from a pixel group in a boundary peripheral area including the boundary between the estimated foreground area and the estimated background area, and disposed on both the estimated foreground area and the estimated background area; and a color determination section that selects, as a color of the extraction result image, a color from candidates of colors so as to:

have a largest sum of color differences on a predetermined color space from all of the plurality of colors extracted in the color extraction section, or have a largest hue difference from all of the plurality of colors extracted in the color extraction section.

* * * * *